United States Patent
Champlin et al.

(10) Patent No.: US 7,355,969 B2
(45) Date of Patent: Apr. 8, 2008

(54) LINE CARD PORT PROTECTION RATE LIMITER CIRCUITRY

(75) Inventors: Brian Champlin, Kanata (CA); John Gryba, Ottawa (CA); Shadia Hijazie, Kanata (CA)

(73) Assignee: Alcatel, Paris (FR)

( * ) Notice: Subject to any disclaimer, the term of this patent is extended or adjusted under 35 U.S.C. 154(b) by 932 days.

(21) Appl. No.: 10/679,287

(22) Filed: Oct. 7, 2003

(65) Prior Publication Data

US 2005/0073952 A1    Apr. 7, 2005

(51) Int. Cl.
H04L 12/26    (2006.01)

(52) U.S. Cl. .................. 370/230; 370/252; 370/412

(58) Field of Classification Search ........ 370/229–235, 370/412, 462, 252, 253
See application file for complete search history.

(56) References Cited

U.S. PATENT DOCUMENTS

| | | | |
|---|---|---|---|
| 5,313,454 A | | 5/1994 | Bustini et al. |
| 5,438,567 A | * | 8/1995 | Ikeda .......................... 370/417 |
| 5,604,867 A | | 2/1997 | Harwood |
| 6,009,078 A | * | 12/1999 | Sato ............................. 370/232 |
| 6,205,155 B1 | | 3/2001 | Parrella et al. |
| 6,381,649 B1 | * | 4/2002 | Carlson ....................... 709/235 |
| 6,473,400 B1 | * | 10/2002 | Manning ..................... 370/229 |
| 6,847,613 B2 | * | 1/2005 | Mimura et al. ............. 370/235 |
| 6,868,062 B1 | * | 3/2005 | Yadav et al. ................ 370/234 |
| 6,925,502 B1 | * | 8/2005 | Abbasi et al. ............... 709/232 |
| 2002/0089933 A1 | * | 7/2002 | Giroux et al. ............... 370/236 |
| 2002/0141339 A1 | * | 10/2002 | Konuma ...................... 370/229 |
| 2005/0041577 A1 | * | 2/2005 | Tiller et al. ................. 370/229 |
| 2005/0047333 A1 | * | 3/2005 | Todd et al. ................. 370/229 |

* cited by examiner

Primary Examiner—Ricky Q. Ngo
Assistant Examiner—Gary Mui
(74) Attorney, Agent, or Firm—Kramer & Amado, P.C.

(57) ABSTRACT

An apparatus for link layer port-based hardware implemented acceptance rate limiting control is presented. The apparatus employs a single up-down counter tracking a receive port buffer occupancy level. The single up-down counter is incremented by a receive line rate clock signal time truncated by a frame receive signal and a feedback frame acceptance control signal. The single up-down counter is decremented at an Service Level Agreement (SLA) agreed upon committed rate at which content is extracted from the receive port buffer. Outputs of comparators determining when the port receive buffer occupancy level is below a low watermark receive port buffer occupancy level, and when the receive port buffer occupancy level is above a maximum burst size, are provided to a master slave flip flop generating the frame acceptance control signal exhibiting hysteresis as the port receive buffer occupancy level transitions between the low watermark and the maximum burst size receive port buffer occupancy levels. The advantages of the link layer port-based hardware implemented acceptance rate limiting control achieved are derived from a deterministic response enforced in real time, at line rate, as content is being received employing a small number of logic gates.

24 Claims, 8 Drawing Sheets

LINE CARD PORT PROTECTION RATE LIMITER CIRCUITRY

FIELD OF THE INVENTION

The invention relates to packet-switched communications, and in particular to line card input-port-based hardware-implemented link layer acceptance rate limiting control.

BACKGROUND OF THE INVENTION

In the field of packet-switched communications, which includes, but is not limited to: X-25, Internet Protocol (IP), Frame Relay (FR), Asynchronous Transfer Mode (ATM), Synchronous Optical NETwork (SONET)/Synchronous Digital Hierarchy (SDH), etc. networking, it is important to limit the acceptance rate at which content is being accepted from a source, typically but not limited to a communications network node, to ensure: that the transport infrastructure of a communications network is not overburdened, that no single source makes excessive use of communications network resources to the detriment of other entities making use thereof, that Service Level Agreements (SLAs) are enforced, etc.

Packet-switched communications concern the conveyance of content segments encapsulated in Protocol Data Units (PDUs) between communications network nodes. Each PDU has an internal make-up, referred to as a "frame", which includes a start-of-frame marker, and a payload holding at least one content segment. PDU frame headers and trailers are populated with network addressing information, and (possibly) control information, to direct each PDU onto a corresponding transport path traversed in the communication network(s) between source and destination communications network nodes.

A novel approach has been undertaken in a related field concerning controlling the rate at which content is being conveyed in communications networks:

A prior art U.S. Pat. No. 5,313,454 entitled "Congestion Control for Cell Networks" which issued May 17, 1994, to Bustini et al., describes a feedback control mechanism for connection-session-based congestion prevention wherein network nodes traversed in a transport path of a corresponding virtual connection, report, using bandwidth reserved for the virtual connection, cell level system buffer occupancies to the destination network node associated with the virtual connection for interpretation, a feedback signal being sent, using bandwidth reserved for the virtual connection, to the source network node associated with the virtual connection which is expected to adjust the source network node transmission rate accordingly. Although inventive, the proposed solution is: limited to ATM content transport characterized by an end-to-end preprovisioned connection, the virtual connection incurs bandwidth overhead in conveying reports and feedback signals, involves virtual connection specific report tracking and interpretation at the destination network node, requires feedback signal interpretation at the source network node, and most importantly hinges on the cooperation of the source network node which in practice may not always be relied upon. An assessment regarding compliance with a customer SLA directly addresses issues related to a source network node's adherence to SLA agreed upon content transmission rates.

Other developments concentrate on output port rate limiting techniques to prevent output port buffers from overloading. These approaches to content conveyance rate control do not address input port congestion and therefore do not address limiting content acceptance rates in a communications network:

A prior art U.S. Pat. No. 6,205,155 entitled "Apparatus and Method for Limiting Data Bursts in ATM Switch Utilizing Shared Bus" which issued on Mar. $20^{th}$, 2001 to Parrella et al., describes an ATM cell-filtering approach to content conveyance rate control based on destination addresses to ensure that output port buffers do not overflow. While inventive in addressing output port congestion in ATM switches, no provisions are made for assessing adherence to SLAs in receiving content at a network node. Because the solution is destination address specific, it does not address denial of service attacks which flood traffic to multiple network addresses and/or setup a large numbers of virtual connections, both scenarios placing high demands on the network node input port resources before the content is switched and output port queued.

Another prior art U.S. Pat. No. 5,604,867 entitled "System for Transmitting Data between Bus and Network having Device Comprising First Counter for Providing Transmitting Rate and Second Counter for Limiting Frames Exceeding Rate" which issued Feb. 18th, 2003 to Harwood, describes a system for limiting the number of multicast and broadcast frames generated by a network node from already accepted content to ensure that a shared bus and output port buffers are not overloaded. The two counter implementation also addresses issues related to content conveyance rate limiting while allowing some content bursting. Although inventive, the presented approach does not address issues concerning adherence to SLAs. Further SLAs concern all types of traffic generated by a source network node not just multicast and broadcast traffic.

Output port transmission rate limiting control as described in the above two prior art patents, would be beneficial in limiting content acceptance rates in communications networks, if such output port transmission rate limiting control was exercised at customer premise equipment. However, as customer premise equipment is not necessarily under the span of control of a service provider, managing an associated communications network, coupled with a disincentive for a customer to correctly and actively limit upstream output port rates, the presented solutions cannot be relied upon and are therefore insufficient. Therefore despite these prior advances, output port limiting employed on edge equipment aggregating upstream content traffic does not address issues related to input port contention for resources at edge network nodes.

Further, content generated by a source network node may be conveyed as connection specific traffic and connection less traffic. A lot of stack processing is involved in imposing conveyance rate limits at the connection level (typically supported by a higher layer content transport protocol) especially if the underlying content transport protocol employed is not a connection oriented content transport protocol.

FIG. 1 is exemplary of interconnected communications network equipment providing communications services to customers 100. Each customer 100, associated with a customer network 101 and/or a customer node 102, is provided with access to communications services via a customer premise transceiver 104 and an access link 106. Each access link 106 is physically connected to a port 108 of a line card (interface card) 110 of an access node 120 designated as an edge of a communications network 130.

In accordance with an exemplary approach, the content conveyed may be regarded by a particular network node receiving thereof for processing as a content stream (audio, video, ticker tape data, etc.), which is segmented into content segments, at least one content segment being conveyed packetized in payloads of individual PDUs conveyed. Content-stream-aware rate limiting control enforced at the particular network node (120): relates to a stream-aware content transport protocol such as, but not limited to: ATM; requires extensive tracking of the PDUs being conveyed in the context of each tracked content stream, thus employing large amounts of memory storage; and therefore is typically implemented at the network layer or above.

In accordance with another exemplary approach, conveyance rate limiting control enforced at a particular network node (120) may address the fact that a particular customer's source network node 102 makes excessive use of shared communications network resources to the detriment of other customers' 102 and 101/102. The content conveyed may be redirected around failure affected communications network infrastructure via redundant access links 106 as shown to be employed by the customer network 101. From the particular point of view of a network node 120 effecting rate limiting control, conveyed content originating from such a rogue source network node 102, may be received at the network node 120 via multiple redundant interconnecting links 106. It is understood that if the rogue source network node 102 makes use of communications services via a customer's network 101, depending on the implementation of the customer's network 101, the entire customer network 101 may have to be labeled as a rogue customer network 101, if the particular rogue customer network node 102 cannot be identified distinctively (network addressing translation etc.) Source-network-node-based rate limiting control: requires extensive tracking of network node addressing and of PDUs received therefrom thus employing large amounts of memory storage; and therefore is typically implemented at the network layer or above.

Network or higher layer implementations suffer from an intensive protocol stack processing necessary in inspecting each received PDU. Making reference to a typical prior art implementation shown in FIG. 2, in connection with both of the above presented exemplary approaches, central processing resources of the communications network node 120 including, but not limited to: system (typically, but not limited to, access node) central processor 122, bandwidth on the system data bus 124, central memory storage 126, etc are employed. Attempts at network and higher layer rate limiting control include software-based solutions which, although flexible and customizable, lack defined response time guarantees. The lack of defined response time guarantees leads to variable delays in processing received PDUs at communications network nodes 120 in the transport path, which leads to further overuse of processing resources including, but not limited to: memory storage overheads, processing bandwidth reductions, excessive content transport delays, excessively varying PDU inter-arrival time periods (jitter), etc.

With rate limiting control effected on received PDUs after the received PDUs have been stored in the central storage 126, a rogue source network node 102 may create contention for bandwidth on the system data bus 124 by sending a large number of PDUs at high rates, the contention unfairly drowning out content traffic received via other physical ports 108 associated with well behaving network nodes 102, before the system processor 122 has a chance to assess the degree to which the latter are affected.

There therefore is a need to solve the above mentioned issues in effecting content traffic control.

SUMMARY OF THE INVENTION

In accordance with an aspect of the invention, a physical port controller is provided. A single up-down counter associated with the physical port controller is incremented as content is received via a corresponding input port, and decremented at a rate at which the input port is serviced. A maximum burst size register holds a value corresponding to a maximum amount of content the input port is permitted to receive as content is being received by the input port at a rate above the input port service rate. A (first) comparator providing, in real time, an acceptance rate limiting control signal in comparing the value of the up-down counter to the value of the maximum burst size register. The acceptance rate limiting control signal provides a link-layer input port-based hardware implemented acceptance rate limiting control.

In accordance with another aspect of the invention, the physical port controller includes a committed rate register holding a value representative of a port service rate. With the service rate corresponding to a Service Level Agreement committed rate, the input port-based hardware implemented acceptance rate limiting control enforces a corresponding SLA agreement.

In accordance with a further aspect of the invention, the physical port controller includes means for introducing hysteresis in effecting acceptance rate limiting control as the value of the up-down counter transitions between a maximum burst size value held in a maximum burst size register and a low watermark value held in a low watermark register.

In accordance with a further aspect of the invention, the physical port controller includes means for providing an assessment of a degree of non-compliance to a corresponding SLA.

In accordance with a further aspect of the invention, a line card having a physical port controller enforcing a corresponding SLA is provided.

In accordance with a further aspect of the invention, a multi-ported line card having a plurality of physical port controllers is provided. The combined operation of the plurality of physical port controllers enforcing acceptance rate limiting control, enforces bandwidth reservations for each corresponding input port on a data bus to which the multi-ported line card is connectable to.

In accordance with a further aspect of the invention, a multi-ported network node having a plurality of physical port controllers is provided. The combined operation of the plurality of physical port controllers enforcing acceptance rate limiting control, enforces bandwidth reservations for each corresponding input port on a data bus servicing the corresponding plurality of physical ports.

In accordance with yet another aspect of the invention, a method of enforcing acceptance rate limiting control for an input port is provided. Method steps include incrementing a single up-down counter associated with the input port as content is received and decrementing the single up-down counter at an input port service rate. An acceptance rate limiting control signal is activated upon determining that the value of the single up-down counter is greater than a maximum burst size value, and deactivating the acceptance rate limiting control signal upon determining that the value of the up-down counter is lower than a low watermark value. The activation and the deactivation of the acceptance rate limiting control signal with the service rate set at an agreed upon SLA committed rate enforcing the SLA at the input port.

The advantages of the port-based hardware content acceptance control achieved are derived from a deterministic response enforced at line rate as content is being received employing a small number of logic gates.

BRIEF DESCRIPTION OF THE DRAWINGS

The features and advantages of the invention will become more apparent from the following detailed description of the exemplary embodiment(s) with reference to the attached diagrams wherein.

Figure 1:
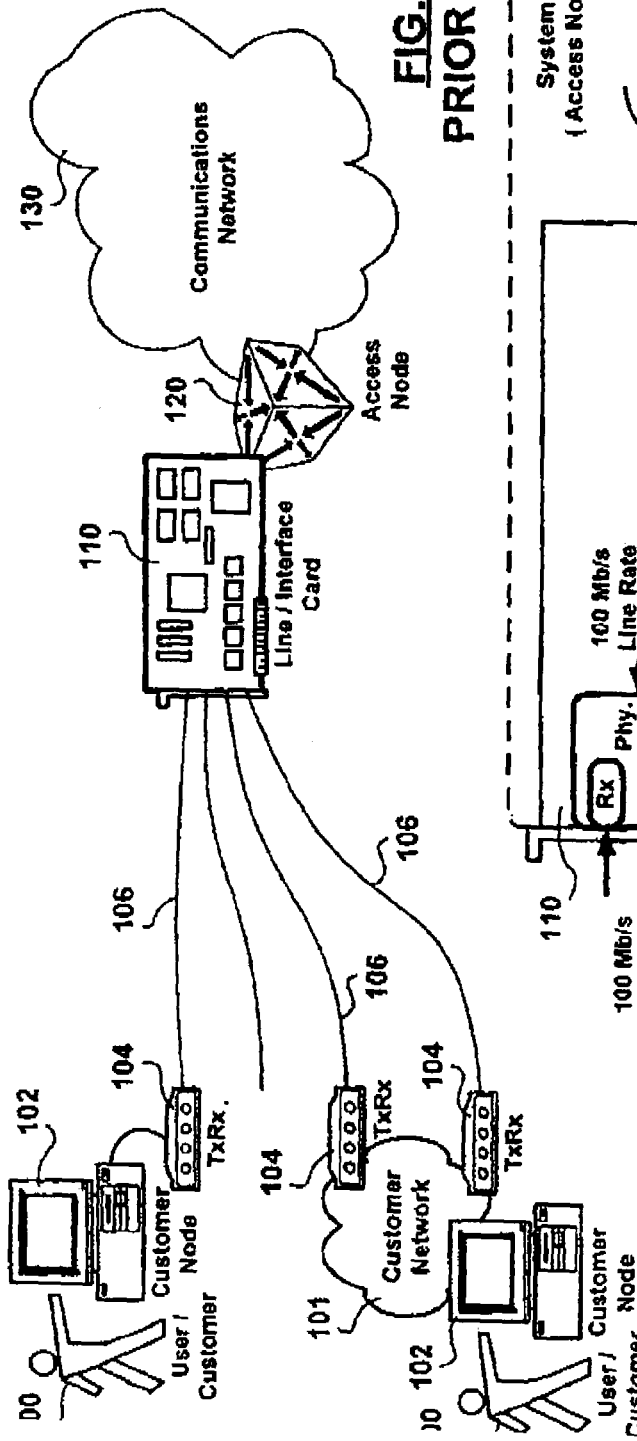
FIG. 1 is a schematic diagram showing typical interconnected communications equipment providing content transport in support of communications services.
Figure 2:
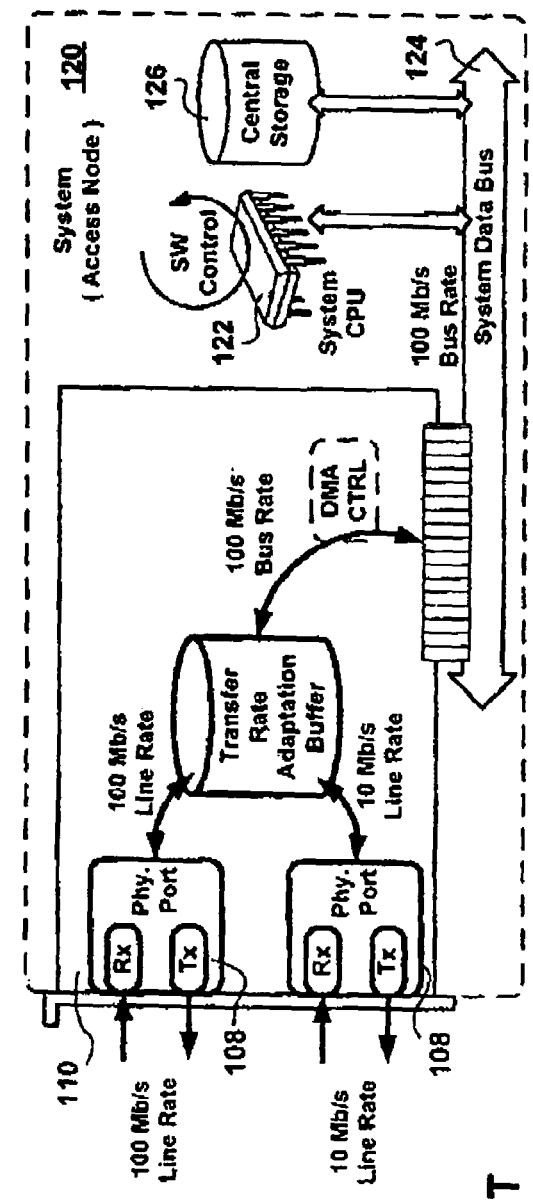
FIG. 2 is a schematic diagram showing typical elements of prior art software-based and/or system-processor-aided content conveyance rate control.

It will be noted that in the attached diagrams like features bear similar labels.

DETAILED DESCRIPTION OF THE EMBODIMENTS

Acceptance rate control solutions may depend, but not exclusively, on: the ultimate type of control desired, the available computing power to effect acceptance rate limiting control, the desired granularity of the conveyance rate limiting control, the communications equipment on which conveyance rate limiting control is to be implemented, etc.

In accordance with the exemplary embodiment of the invention, in order to: protect a communications network from abuse, ensure fairness, and provide flexibility in the utilization of communication network resources, while enforcing adherence to SLA agreements; an input-port-based hardware-implemented link layer acceptance rate limiting control is provided, operating irrespective of whether the traffic is connection-oriented or connectionless, and irrespective of destination thereof:

Of particular relevance are input-port-based hardware content acceptance rate control implementations for multi-ported line cards 210, examples of which are shown in FIG. 3, FIG. 4, FIG. 5, FIG. 6, and FIG. 7. As is typical of current hardware line card design, in view of market drivers such as, but not limited to: miniaturization, box consolidation, low cost, increased port density, increased transport bandwidth, etc.; for line cards 210 to run close to maximum data bus (224) throughput, frame and content processing bandwidth is oversold—the aggregate physical bandwidth of all ports 208 of each line card 210 being larger than the bandwidth of the network node system data bus 224.

In accordance with an n-port Ethernet line card 210, but not limited thereto, a fraction of the bandwidth available at one corresponding port 208 of the n ports 208, each operating at corresponding physical rates, is committed, via a customer SLA, for content transport in the up-link direction. If the customer transmits content at a rate above the SLA specified committed rate, by more than an allowed maximum burst size, then some of the transmitted content is to be dropped until the maximum (average) transmit rate drops to or below the SLA specified committed rate.

The shared resources of the n-port Ethernet card 210 must be allocated such that the total bandwidth committed to all the ports 208, and by extension to all corresponding customers 100, will not exceed the processing bandwidth of the shared resources on the line card 210, between which the bandwidth of the data bus 224. If one of the customers exceeds the bandwidth committed thereto and therefore if the corresponding port 208 on the line card 210 receives content at a rate above the SLA agreed upon committed rate, then at least some of the other customers 100 associated with the other n−1 ports 210 on the line card 210 may not be serviced in accordance with their SLAs. Therefore in enforcing acceptance rate limiting control, it must be ensured that configuring ports 208 in accordance with customer SLAs, the aggregate of all committed rates guaranteed for all serviced customers serviced via the line card 210 is less or equals to the bandwidth of the system data bus 224 to prevent frame drops. Typically customers 100 are assigned corresponding SLA committed rates at or below the physical rate the corresponding physical port 208 can operate at, and at or below the physical rate of the data bus 224 can operate at.

Multiported line cards 210 are employed in communications network node systems 120—the solutions presented herein may also be employed in any multiported network node equipment in which multiple ports contend for limited resources, such as but not limited to, bandwidth on a data bus. The description of the provided solution will be presented with respect to a generic multiported line card in order to detach the solution to the above presented problem from other content processing tasks typically performed by a communications network node including but not limited to: queuing disciplines, queue service disciplines, buffer congestion, switching, transport protocol dependent issues, etc. The particulars of exemplary embodiment of the invention presented herein with respect to a line card can equally be applied to multiported network equipment.

A degree of flexibility is sought as content traffic conveyance patterns are inherently bursty over various time scales which is representative of a typical on-demand utilization of communications services. It is desirable that acceptance rate limiting control not be too strict as the need for content transport is typically sporadic yet intense (bursty) to provide a snappy response (perceived as a momentarily fast access although unsustainable in accordance with SLA agreements). It is desirable therefore that for short periods of time, as other ports 208 do not convey content momentarily, that a momentarily active port 208 receive more than its SLA agreed upon fair share of bandwidth, of course long term SLA agreed upon rates being observed. For this reason interrupt (274) and/or polling techniques are typically used, between the ports 208 and a traffic management function 222 of the network node, to inform the traffic management function 222 that content is available in a corresponding port receive buffer 212. However, should other ports 208 also be active, content conveyed via the other ports 208 should not be unduly suppressed because the highly active port 208, perhaps corresponding to a rogue customer network node 102, uses more network node resources more often.

In accordance with an exemplary embodiment of the invention, making particular reference to FIG. 3, FIG. 4, FIG. 5, FIG. 6, and FIG. 7, a leaky-bucket-type physical-port-based acceptance rate limiting hardware-implemented controller 209 is employed for each port 208 on an exemplary line card 210 as shown. A single up-down counter 250 is provided per port 208 to implement rate limiting control by tracking port receive buffer (212) occupancies, at reduced implementation costs. Also provided per port 208 is a first register settable to, and holding, a threshold value corresponding to a maximum amount of content the receive port buffer 212 is allowed to store, on a limited time basis, as content is being received temporarily faster than the SLA agreed upon committed rate. The first register will be referred to herein as the maximum burst size register 254. It is intended, as will be described herein below, that rate limiting control be exercised should the receive port buffer occupancy exceed the value held in the maximum burst size register 254.

In accordance with the exemplary embodiment of the invention, the acceptance rate limiting control, being actively exercised, is intended to continue (hysteresis) until the receive port buffer occupancy level subsides substantially. Further provided per port 208 is a second register settable to, and holding, a low watermark value corresponding to a number of bytes the receive port buffer 212 is allowed to store, expecting that the receive port buffer occupancy level will continue to subside as frames received via the corresponding physical port 208, begin to be accepted again. The second register will be referred to herein as the low watermark register 252.

The line card 210 implementation include, but is not limited to, Ethernet line card 210 implementations. Such link-layer hardware-implemented acceptance rate limiting control on an Ethernet line card 210 enforces an SLA agreed upon committed rate treating equally all types of content traffic conveyed including: connection-oriented traffic, connectionless traffic, prioritized traffic, differentiated traffic, Virtual Local Area Network (VLAN) traffic, etc. irrespective of the source and/or destination network nodes associated therewith.

Figure 3:
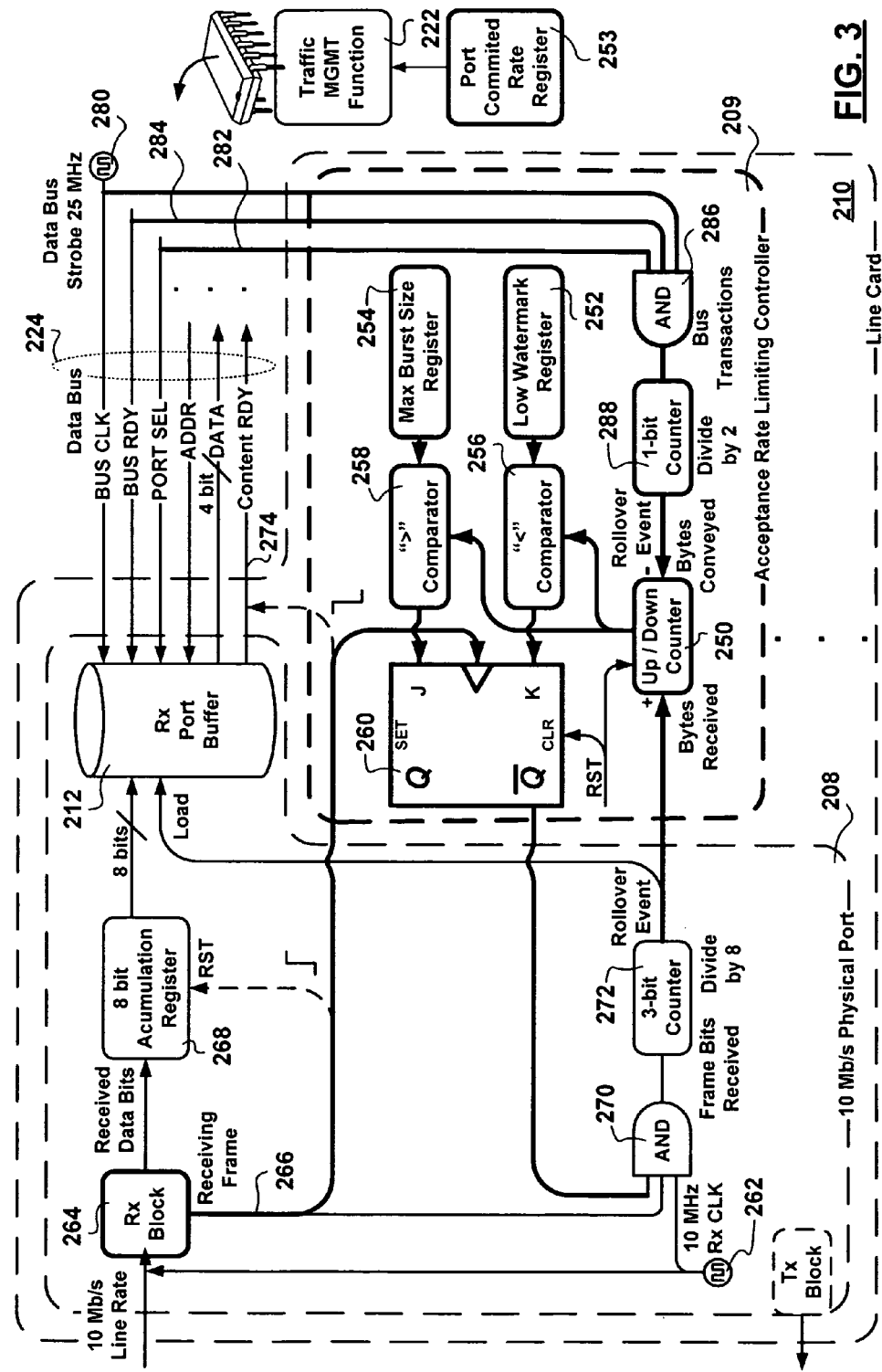
FIG. 3 is a schematic diagram showing, in accordance with an exemplary embodiment of the invention, an exemplary physical-port-based hardware content acceptance rate control implementation.
Figure 4:
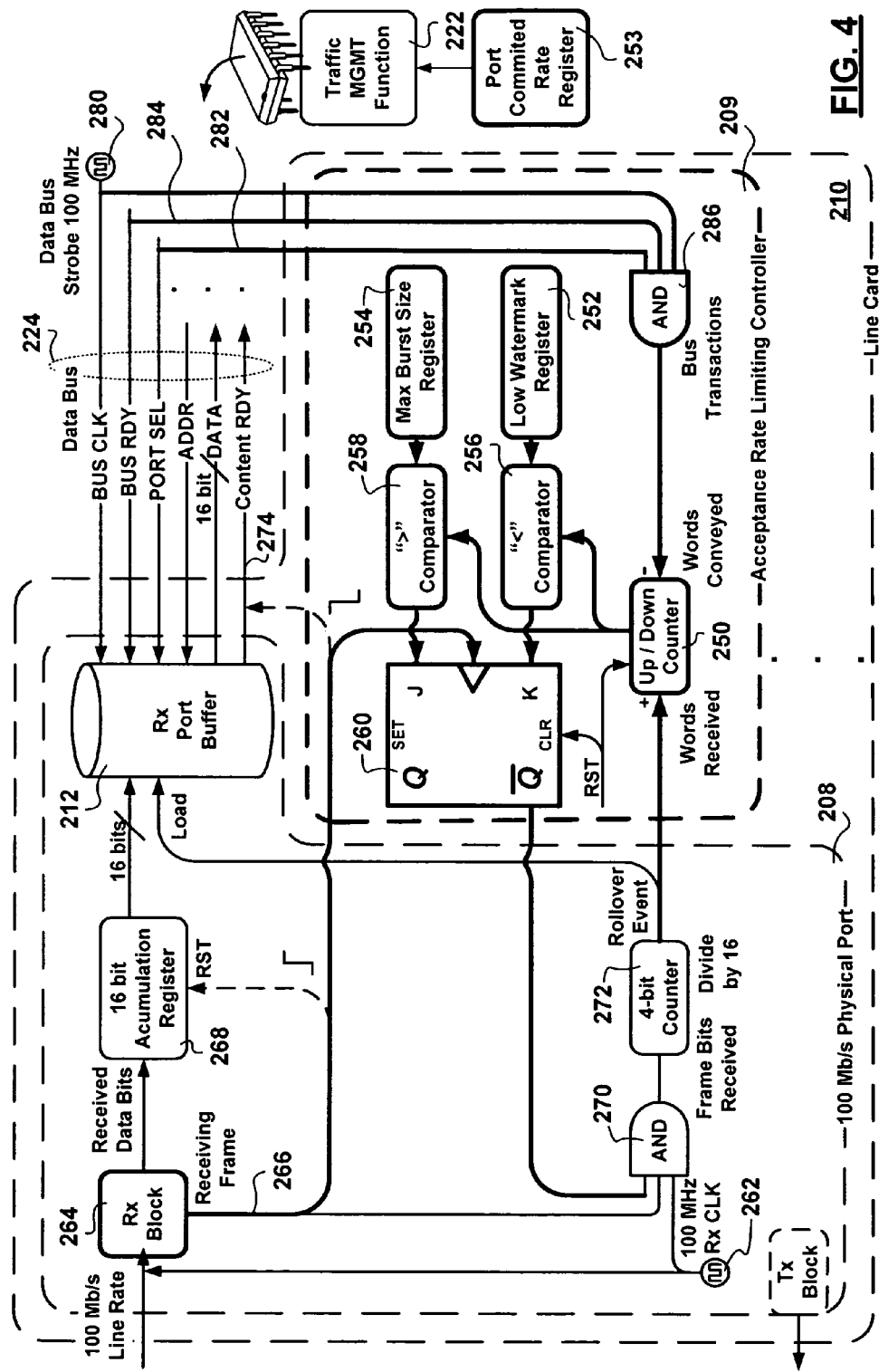
FIG. 4 is another schematic diagram showing, in accordance with the exemplary embodiment of the invention, another exemplary physical-port-based hardware content acceptance rate control implementation.
Figure 5:
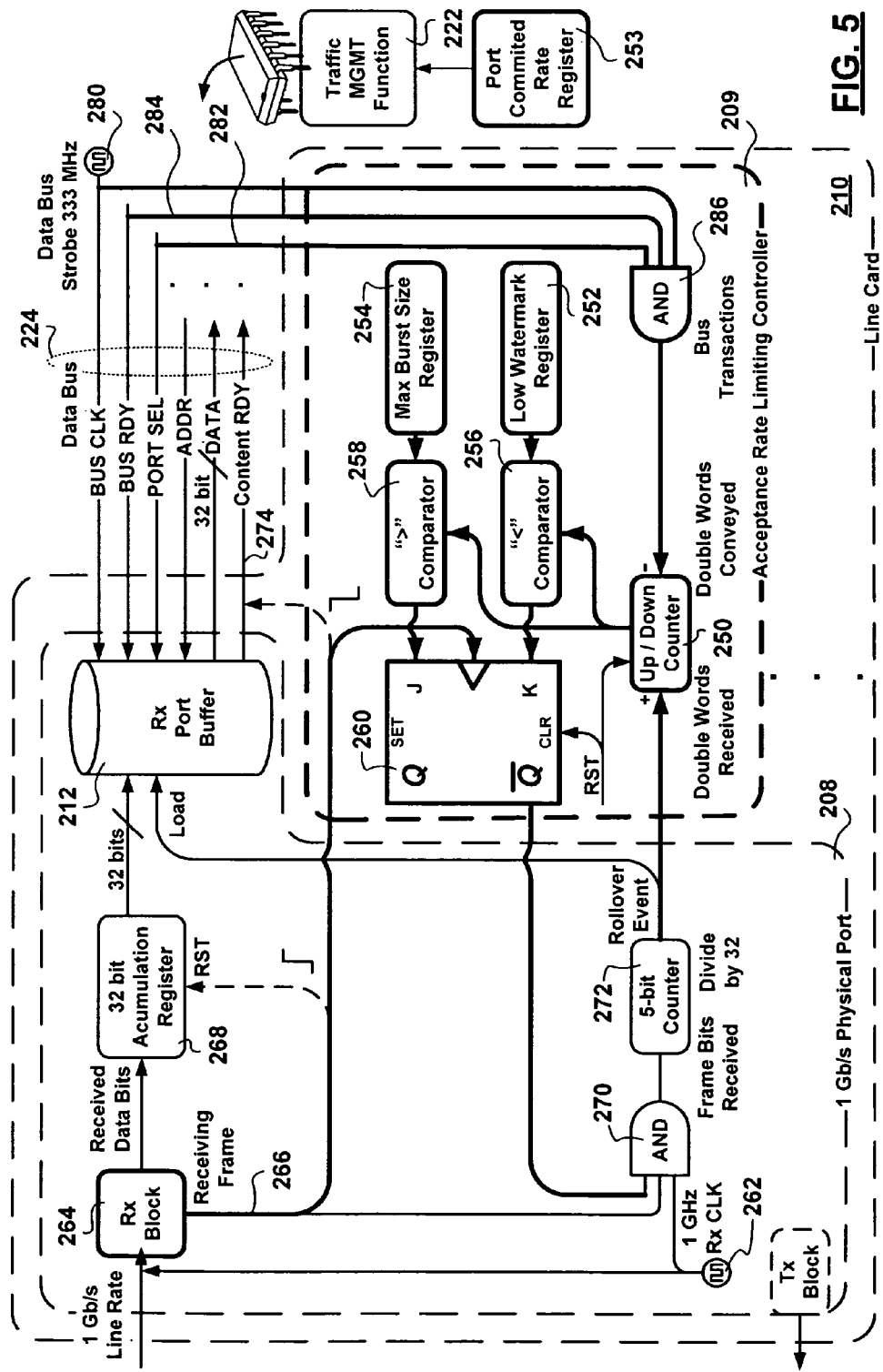
FIG. 5 is a further schematic diagram showing, in accordance with the exemplary embodiment of the invention, a further exemplary physical-port-based hardware content acceptance rate control implementation.

In accordance with an exemplary implementation of the exemplary embodiment of the invention, presented in FIG. 3, FIG. 4, and FIG. 5, customer 100, and therefore corresponding port 208, —specific SLA agreed upon committed rate information is provided to the traffic management module 222 associated with the network node system 120 and particularly stored in a committed rate register 253. The traffic management module 222, operating in accordance with port service disciplines described elsewhere, services, at least on average, each physical port 208 at the committed rate corresponding thereto. More details are presented herein below with reference to a port select signal 282.

Accordingly, assuming that the traffic management module 222 causes the receive port buffer 212 to be emptied, on average, at the committed rate, comparators 256 and 258 respectively determine whether the content reception rate conforms to the SLA agreed upon committed rate by monitoring the port's receive buffer occupancy levels.

Assuming that the system services the receive port buffer 212 at the committed rate, content accumulates in the receive port buffer 212 only when content is being received at a rate higher than the committed rate; the receive port buffer occupancy level remaining zero if content is being received at a rate lower than the committed rate. A first comparator 258 determines when the port's receive buffer occupancy level is above the maximum burst size threshold specified via the maximum burst size register 254. The output of the first comparator 258 is provided to the "J" input of a "J-K" flip-flop 260. It will be understood that the J-K flip-flop is representative of a larger class of electronic components known as master-slave flip-flops, the description of the operation of the hardware port-based rate limiting controller 209 presented herein being intended only to make exemplary reference to, and use of, J-K flip-flops.

A receive block 264 detects and extracts valid receive frame markers and valid received frame bits from a signal received over a physical (access) link (106) connected thereto. More information regarding "valid" frames and "valid" bits will be provided below with reference to setting the low watermark level to zero. The extracted valid frame markers are used to derive a "receiving frame" signal 266 which is kept logically active while a valid frame is actively being received. The J-K flip-flop 260 is clocked on the raising edge of the receiving frame signal 266 provided thereto. On receiving the next frame, the J-K flip-flop 260 provides an acceptance rate limiting control signal Q-bar which is used, as will be described below, in suppressing (acceptance) storage of subsequently received frames in the port's receive buffer 212.

As the occupancy level of the receive port buffer 212 subsides, the second comparator 256 determines whether the occupancy level of the port's receive buffer 212 is below the low watermark value held in the low watermark register 252. The output of the second comparator 256 is provided to the "K" input of the J-K flip-flop 260. With the J-K flip-flop 260 being clocked (266) as frames are being received, the acceptance rate limiting control signal from the output Q-bar of the J-K flip-flop 260 exhibits the desired hysteresis characteristics sought as described above.

It is understood that using an J-K flip-flop 260, hysteresis is achieved via a hardware implementation employing a small number of logic gates/electronic components at minimal implementation costs ensuring: implementation stability, a clean start up, and support for testing. Other master-slave flip-flops may be employed instead providing a variety of further features and further optimizations.

The rest of the implementation details will be described briefly to present further operations and features of the link layer input-port-based hardware-implemented acceptance rate limiting control provided.

In accordance with the exemplary implementation of the exemplary embodiment presented in FIG. 3, content is being exemplary conveyed at a 10 Mb/s nominal line rate over a corresponding link 106. A 10 MHz receive clock 262 is provided to the port 208 to aid the receive block 264 in extracting valid bits from the received signal.

The raising edge of the receiving frame signal 266 is further employed to reset an accumulation register 268, after which the accumulation register 268 gathers a valid sequence of frame bits extracted by the receive block 264. The accumulation register 268 has a selected accumulation width which relates to the content acceptance control granularity. In accordance with the exemplary implementation presented in FIG. 3, the accumulation width is 8 bits and therefore a byte level granularity conformance with the SLA being detected, the content acceptance rate limiting control is being applied to received frames.

A line clock signal (262) and the receiving frame signal 266 are provided to a multi-input AND gate 270 which produces a signal train repeating at the line rate throughout the duration of each valid and allowed frame, in real time, as the frame is actively received. The determination as to whether a particular frame being received is allowed, is provided by the acceptance rate limiting control signal from the Q-bar output of the J-K flip-flop 260.

As the frame bits are being accumulated in the accumulation register 268, a corresponding bit counter 272, having a counting width corresponding to the accumulation width of the accumulation register 268, counts valid accepted frame bits being received in accordance with the signal train output by the AND gate 270, and rolls over as the accumulation register 268 fills up. The rollover event of the bit counter 272 is employed to load, in accordance with the exemplary implementation presented in FIG. 3, frame bytes stored in the accumulation register 268 into the receive port buffer 212. The rollover event of the bit counter register 272 is further employed by the up-down counter 250 to increment the number of bytes added to the receive port buffer 212. Auxiliary receive port buffer circuitry (not shown) generates the content ready signal 274 derived from the falling edge of the receiving frame signal 266 to signal content availability in the receive port buffer 212 to the traffic management function 222.

The receive port buffer 212 is emptied via the data bus 224. Transactions on the data bus 224 typically run at a different clock frequency provided by a data bus strobe 280.

In accordance with the exemplary implementation depicted in FIG. 3, FIG. 4, and FIG. 5, actual content extraction from the receive port buffer 212 may be tracked by counting bus transaction reading content from the receive port buffer 212. A particular port 208 is selected to be serviced by the traffic management module 222 to extract frames from the corresponding receive port buffer 212 by employing a port select signal 282. Bus transaction instances reading content from the receive port buffer 212 of a particular port 208 are identified from a logical combination of the bus clock signal (280), the corresponding port select signal 282, and a bus ready signal 284, etc. typically implemented via a multi-input AND gate 286.

The amount of content extracted from the port receive buffer 212 in each data bus transaction is dependent on the (data) width of the data bus 224. In accordance with the exemplary implementation of the exemplary embodiment of the invention, shown in FIG. 3, the data bus strobe 280 runs at 25 MHz and the data bus 224 is 4 bits wide—a nibble being transacted over the data bus 224 during each bus clock cycle (280).

In accordance with the exemplary implementation of the exemplary embodiment of the invention presented in FIG. 3, a 1-bit counter 288 (or a D flip-flop) is employed to convert the number of nibbles extracted from the receive port buffer 212 into a number of extracted bytes. The rollover event of the 1-bit counter 288 (or the output of the D flip-flop), marking extracted byte boundaries, is provided to the up-down counter 250 to decrement the value thereof in tracking the occupancy of the receive port buffer 212.

FIG. 4 and FIG. 5 depict further exemplary implementations of the exemplary embodiment of the invention, for 100 Mb/s and 1 Gb ports 208 which employ: a 100 MHz and a 1 GHz receive clock respectively; a 16 bit and a 32 bit accumulation register 268 respectively; a 4-bit and a 5-bit accumulation counter 272 respectively; the single up-down counter 250 tracking receive port buffer occupancy in words and double words respectively; and an 16-bit and a 32-bit data bus 244 respectively running at 100 HMz and 333 MHz (280) respectively.

As the traffic management module 222 services the receive port buffer 212 at the SLA agreed upon committed rate specified in the committed rate register 253, the desired link layer hardware implemented input-port-based acceptance rate limiting control is achieved in a steady state operation of exemplary implementation of the exemplary embodiment of the invention:

The low watermark threshold value of the low watermark register 252 may theoretically be set to zero, however in practice a zero low watermark threshold value would require an intensive utilization of a lot of resources at the network node 120. For certainty, content is being received at line rate as described above respecting the operation of bit counter 272. As the line rate is typically greater than the committed rate, the corresponding transceiver 104 transmits content bearing frames and empty frames. Typically empty frames are marked as such, the valid frames mentioned herein correspond to content bearing frames. The selection of values for the maximum burst size register 254 and the low watermark register 252 not only have to take into account the SLA agreement but also the physical content reception characteristics of the corresponding physical port.

Desired network node system (120) operation may benefit from a number frames being accumulated in the port receive buffer 212 before being extracted therefrom to optimize other aspects (274) related to the operation of the network node system 212 and described elsewhere. For greater certainty, although the description of the presented solution relates to a receive port buffer 212, the maximum burst size threshold value held by the maximum burst size register 254, and the low watermark value held by the low watermark register 252 may be employed separately from circuitry employed in tracking, identifying, and mitigating input port congestion. The exemplary implementations of the exemplary embodiment of the invention described herein following employ methods which further distance acceptance rate limiting control from input port congestion mitigation.

In accordance with the exemplary embodiment of the invention, link layer hardware implemented acceptance rate limiting control may be exercised based on a "pseudo" receive port buffer occupancy level and a "pseudo" receive port buffer service rate without tracking actual data bus 224 transactions corresponding to content extraction from the port receive buffer 212.

Figure 6:
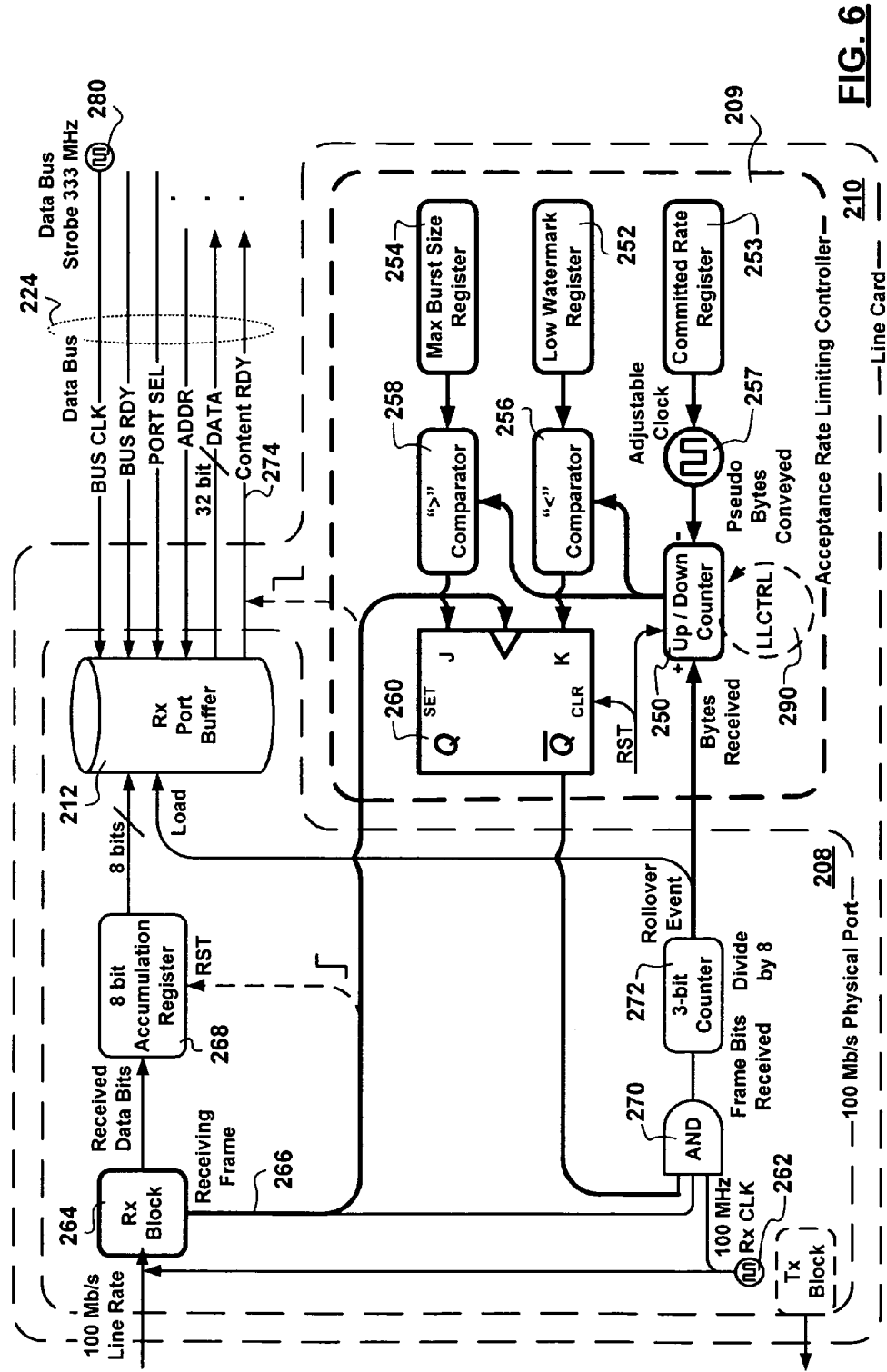
FIG. 6 is a further schematic diagram showing, in accordance with the exemplary embodiment of the invention, a further exemplary physical-port-based hardware content acceptance rate control implementation.

FIG. 6 depicts an exemplary implementation of the exemplary embodiment of the invention, for a 100 Mb/s port 208 which employs: a 100 MHz receive clock; an 8 bit accumulation register 268; a 3-bit accumulation counter 272; the single up-down counter 250 tracking receive port buffer pseudo occupancy in bytes; and a 32-bit data bus 244 running at 333 MHz. The (pseudo) receive port buffer occupancy is increased, as described above, based on actual content reception and acceptance, and decreased at a constant rate corresponding to the SLA agreed upon committed rate.

A committed rate register 253, associated with the port's acceptance rate limiting controller 209, stores a numeric value used to program an adjustable clock 257 to create a signal train at a frequency corresponding to the SLA committed rate and therefore represents an intended pseudo receive port buffer service rate. The signal train is employed by the single up-down counter 250 to decrease the value thereof at the SLA agreed upon committed rate which on average is expected to be the rate at which the port receive buffer 212 is being serviced by the traffic management function 222.

Figure 7:
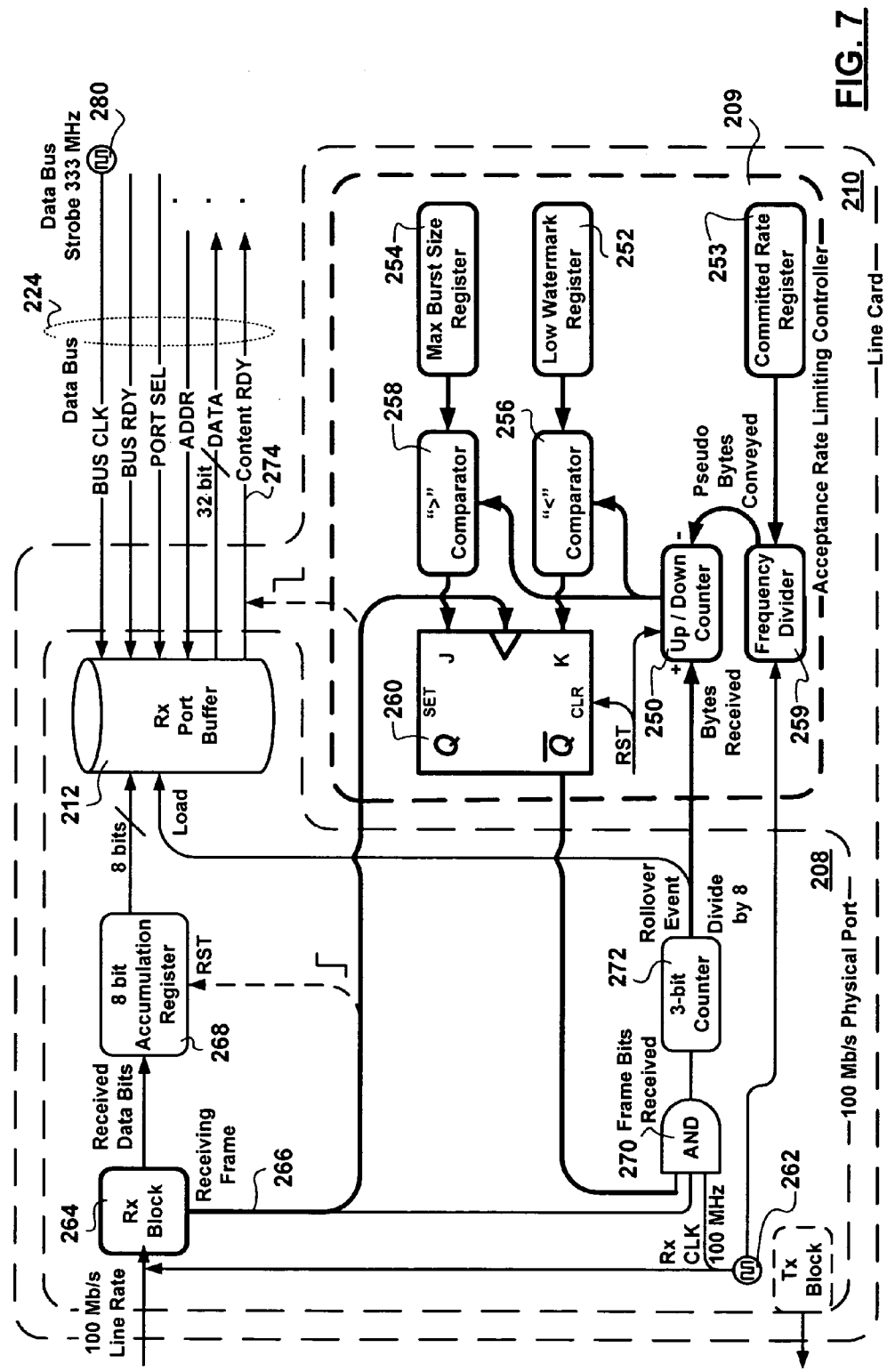
FIG. 7 is yet another schematic diagram showing, in accordance with the exemplary embodiment of the invention, yet another exemplary physical-port-based hardware content acceptance rate control implementation.

In accordance with another implementation of the exemplary embodiment of the invention shown in FIG. 7, the committed rate register 253 holds a value used obtain signal trains from the receive clock 262 having fractional rates thereof, the value of the committed rate register 253 being used to program a frequency divider 259.

Whether the signal train employed in decrementing the single up-down counter 250 is synchronized to the port receive clock 262 as shown in FIG. 7 or not relates to whether a synchronous up-down counter 250 is employed and left to design choice.

With the single up-down counter 250 tracking pseudo receive port buffer occupancy, the low watermark threshold value of the low watermark register 252 may be set to zero.

With the adjustable clock 257, or the frequency divider 259, causing the up-down counter 258 to decrement at a constant rate regardless of the occupancy level of the receive port buffer 212, it is possible for the single up-down counter 250 to take on negative values (if unchecked) during long periods during which the port 208 does not receive content. To alleviate this condition, a saturating counter may be employed which would not decrement the value of the single up-down counter 250 below zero by design. To reduce costs however, a signal derived from the negative bit of the counter value may be used to reset the up-down counter 250 to zero.

Figure 8:
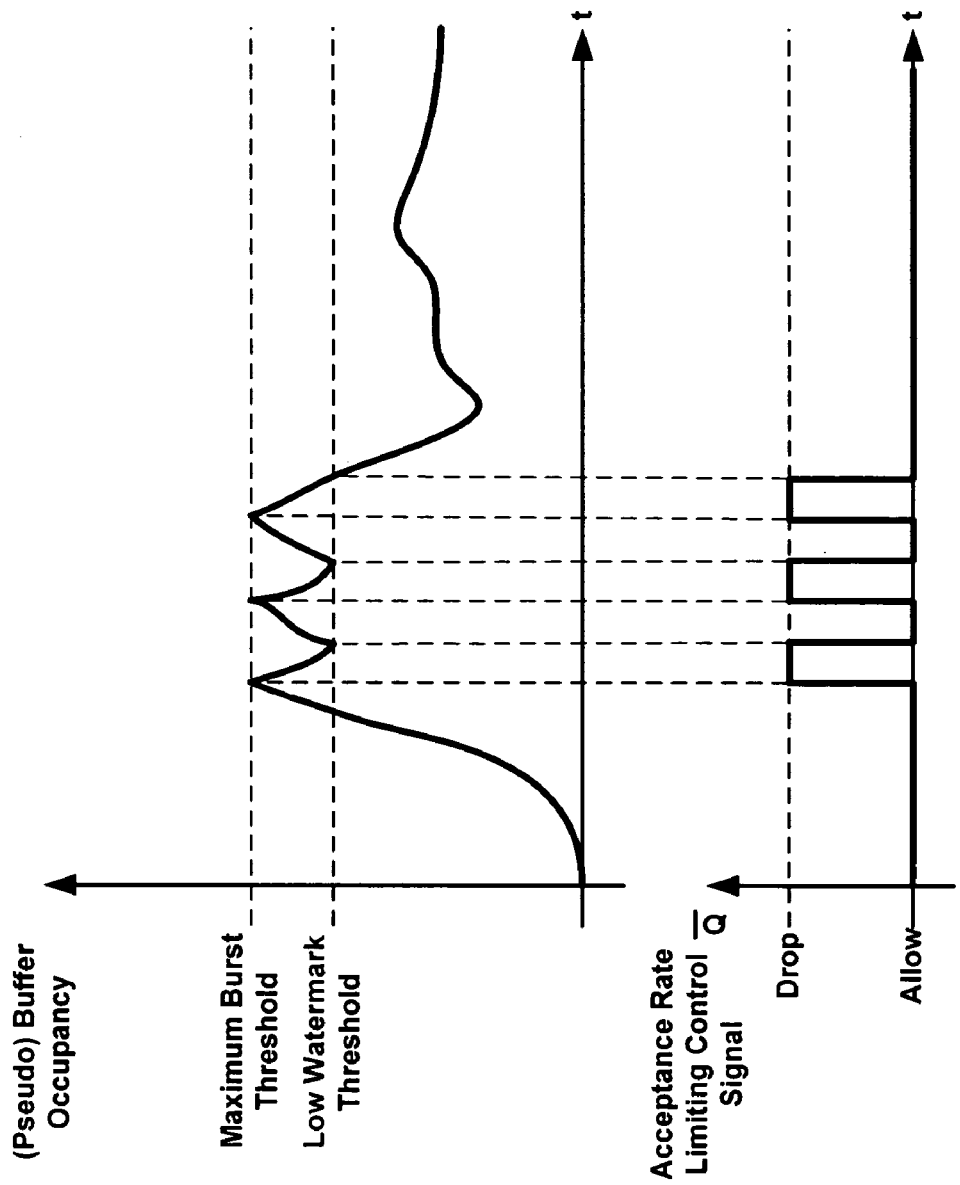
FIG. 8 is a graphical representation of an exemplary content acceptance rate controlled traffic pattern at an exemplary physical port, in accordance with the exemplary embodiment of the invention.

FIG. 8 depicts a traffic pattern resulting from the exemplary acceptance rate limiting control presented being enforced at a port 208 receiving a large content burst. Frames are being dropped in accordance with an acceptance rate limiting control signal Q-bar only as the (pseudo) port receive buffer occupancy level of the port 208 exceeds the maximum burst size, the acceptance rate limiting control signal being reset as the receive port buffer 212 is emptied after the receive rate falls below the low watermark threshold value.

Alternatively the fact that the value of the single up-down counter 250 may be allowed to take on negative value during time periods during which the port 208 does not transmit in support of credit-based arbitration, to give the port 208 credit for not having required servicing for a while to the benefit of other ports on the line card 210. Such low level control (LLCTRL) is shown at 290.

The port-based hardware acceptance rate limiting control presented herein is achieved with a deterministic response enforced in real time, at line rate, as content is being received employing a small number of logic gates.

By extension, it is understood that the solution presented herein above may be employed in connecting service provider networks via access links to Wide Area Networks (WAN) with due change of particulars.

Besides the benefits of an Ethernet specific implementation mentioned herein above, the generically described link layer port-based hardware implemented acceptance rate limiting control may be implemented on multi-ported line cards 208 supporting other content transport protocols including but not limited to: X-25, IP, FR, ATM, SONET/SDH, etc. A frame level acceptance rate limiting control may be employed in respect of frames conveyed in accordance with a content transport protocol employing fixed sized frames such as, but not limited to, ATM cell transport.

Figure 9:
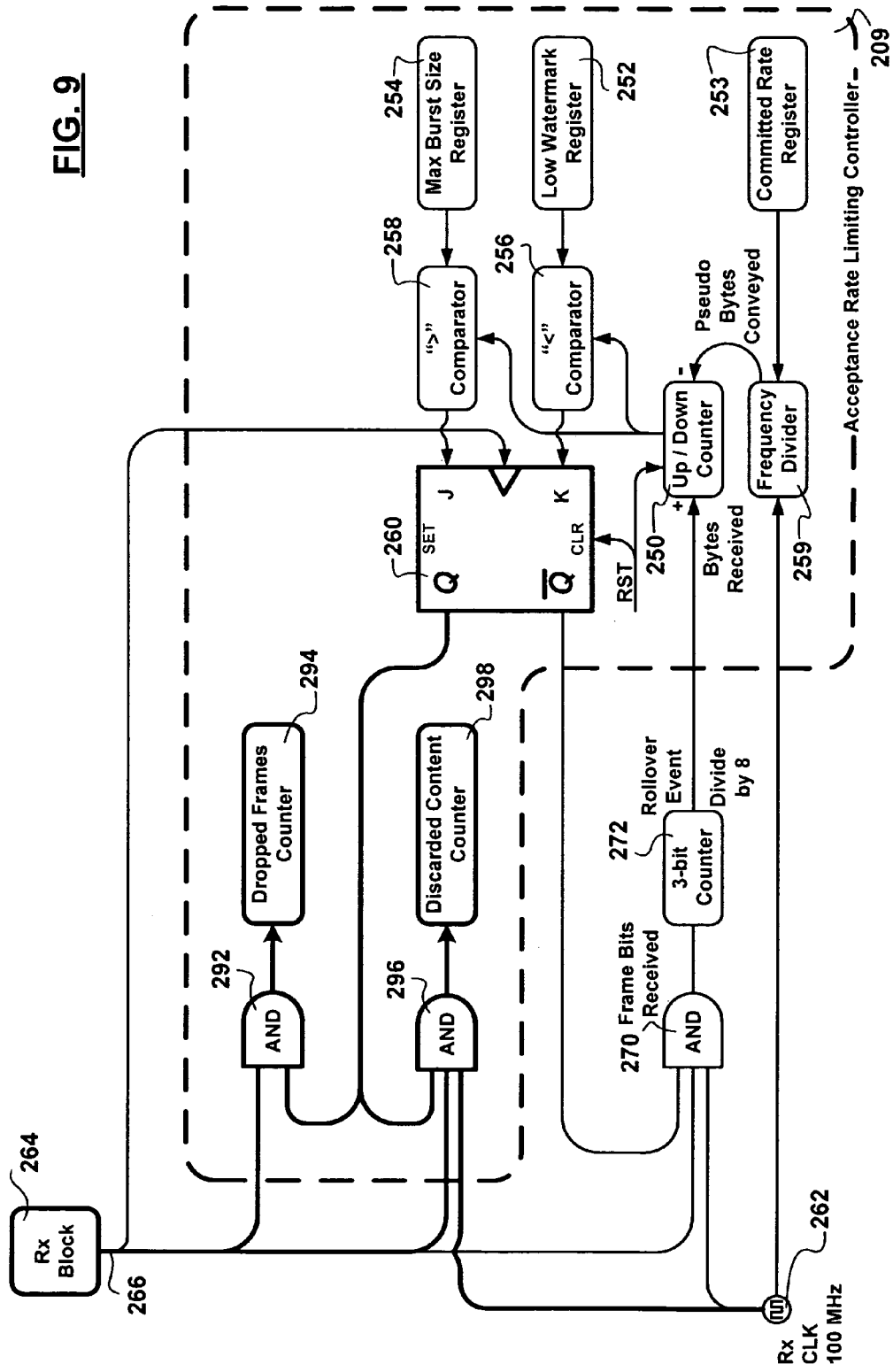
FIG. 9 is a schematic diagram showing, in accordance with the exemplary embodiment of the invention, an exemplary implementation of a tracking mechanism employed in providing an assessment of a degree to which an content was discarded in enforcing acceptance rate limiting control for a port.

A degree of (non-)adherence to a corresponding the committed rate, agreed upon and specified in a corresponding SLA, may be provided to a customer 100(/101) in terms of the number of frame drops and/or discarded content, as shown in FIG. 9, by counting valid frame markers and/or valid frame bits received while the frame acceptance is actively suppressed. A Q signal output by the exemplary J-K flip-flop 260 is logically ANDed 292 with the receiving frame signal 266, the resulting signal being provided to a dropped frame counter 294. The Q signal output by the exemplary J-K flip-flop 260 is further logically ANDed 296 with the receiving frame signal 266, and the receive clock signal (262), the resulting signal being provided to a dropped content counter 298.

The embodiments presented are exemplary only and persons skilled in the art would appreciate that variations to the above described embodiments may be made without departing from the spirit of the invention. The scope of the invention is solely defined by the appended claims.

We claim:

1. A physical port controller for a port having an input port service rate and a maximum rate on a multi-port card having ports that run at different line rates, comprising:
   a. an up-down counter being incremented as content is received via a corresponding input port and decremented at the input port service rate when no frame is received;
   b. a maximum burst size register holding a value corresponding to the maximum rate, the maximum rate being a maximum amount of content the input port is allowed to receive as content is being received by the input port at a rate above the input port service rate; and
   c. a first comparator providing in real time an acceptance rate limiting control signal only when the value of the up-down counter is greater than the value of the maximum burst size register,
   the acceptance rate limiting control signal providing link-layer input port-based hardware implemented acceptance rate limiting control.

2. The physical port controller claimed in claim 1, further comprising a committed rate register holding a value representative of the service rate, the service rate corresponding to a Service Level Agreement (SLA) committed rate, the input port-based hardware implemented acceptance rate limiting control enforcing a corresponding SLA agreement.

3. The physical port controller claimed in claim 2, wherein the physical port is one of an Ethernet port, an Asynchronous Transfer Mode port, a Frame Relay port, and a Synchronous Optical Network/Synchronous Data Hierarchy port.

4. The physical port controller claimed in claim 1, wherein the tip-down counter value is representative of a buffer occupancy level of a receive port buffer.

5. The physical port controller claimed in claim 1, further comprising means for incrementing the up-down counter as valid content is received.

6. The physical port controller claimed in claim 5, wherein the means for incrementing the up-down counter is responsive to a combination of a receiving frame signal, a line clock signal, and the acceptance rate limiting control signal.

7. The physical port controller claimed in claim 1, further comprising means for decrementing the up-down counter.

8. The physical port controller claimed in claim 7, wherein the means for decrementing the up-down counter further comprises one of: means for identifying bus transactions servicing the input port, and means for generating a signal train at the service rate.

9. The physical pod controller claimed in claim 8, wherein the means for generating a signal train at the service rate further comprises a committed rate register holding a value employed in programming one of: an adjustable signal train generator generating a signal train at the service rate, and a frequency divider to derive a signal train at the service rate from a line rate dock associated with the port.

10. The physical port controller claimed in claim 7, further comprising a second comparator determining in real time whether the value of the up-down counter is less than the value specified in a low watermark register in determining that the input port is receiving content at a rate below the service rate.

11. The physical port controller claimed in claim 10, further comprising means for introducing hysteresis in effecting acceptance rate limiting control as the value of the up-down counter transitions between the maximum burst size value held in the maximum burst size register and the low watermark value held in the low watermark register.

12. The physical port controller claimed in claim 11, wherein the means for introducing hysteresis in effecting acceptance rate limiting control further comprises: a master-slave flip-flop.

13. The physical port controller claimed in claim 12, wherein the master slave flip-flop further comprises a J-K flip-flop.

14. The physical port controller claimed in claim 10, further comprising means for providing an assessment of a degree of non-adherence to a corresponding SLA.

15. The physical port controller claimed in claim 14, wherein the means for providing the assessment of the degree of non-compliance to the SLA further comprises a dropped frame counter counting the number of frames dropped derived from a logical combination between the receiving frame signal and the acceptance rate limiting control signal.

16. The physical port controller claimed in claim 15, wherein the means for providing the assessment of the degree of non-compliance to the SLA further comprises a discarded content counter counting the amount of content discarded derived from a logical combination between the receiving frame signal, the acceptance rate limiting control signal, and a line clock signal.

17. A line card comprising a physical port controller claimed in claim 1, the operation of the physical port controller, in enforcing acceptance rate limiting control, ensuring that the reception rate of a corresponding input port associated with the line card does not exceed a highest service rate at which a data bus to which the line card is connectable to can operate at.

18. The line card claimed in claim 17, further comprising one of: an Ethernet line card, a Frame Relay line card, an Asynchronous Transfer Mode line card, and a Synchronous Optical Network/Synchronous Digital Hierarchy line card.

19. A multi-ported line card comprising a plurality of physical port controllers claimed in claim 1, the combined operation of the plurality of physical port controllers enforcing acceptance rate limiting control enforces bandwidth reservations for each corresponding input port for corresponding portions of bandwidth on a data bus to which the multi-ported line card is connectable to.

20. The multi-ported line card claimed in claim 19, further comprising one of: a multi-ported Ethernet line card, a multi-ported Frame Relay line card, a multi-ported Asynchronous Transfer Mode line card, and a multi-ported Synchronous Optical Network/Synchronous Digital Hierarchy line card.

21. A multi-ported network node comprising a plurality of physical port controllers claimed in claim 1, the combined operation of the plurality of physical port controllers, in enforcing acceptance rate limiting control, reserving for each input port corresponding portions of bandwidth on a data bus servicing the corresponding plurality of physical ports.

22. A method of enforcing acceptance rate limiting control for an input port having a service rate and a maximum rate on a multi-port card having ports that run at different line rates, comprising the steps of:
　a. incrementing the value of an up-down counter associated with the input port as content is received;
　b. decrementing the value of the up-down counter at a service rate when no frame is received;
　c. activating an acceptance rate limiting control signal upon determining that the value of the up-down counter is greater than a maximum burst size value; and
　d. deactivating the acceptance rate limiting control signal upon determining that the value of the up-down counter is lower than a low watermark value,
　the activation and the deactivation of the acceptance rate limiting control signal with the service rate set at an agreed upon Service Level Agreement (SLA) committed rate enforcing the SLA at the input port.

23. The method claimed in claim 22, wherein decrementing the up-down counter, the method further comprising a step of: generating a signal train repeating at the service rate by programming an adjustable clock with a value specified by a committed rate register.

24. The method claimed in claim 22, wherein decrementing the up-down counter, the method further comprising a step of: generating a signal train repeating at to service rate by programming a frequency divider to derive the signal train from a line clock associated with the input port.

* * * * *